United States Patent [19]

Basuthakur et al.

[11] Patent Number: 5,779,195
[45] Date of Patent: Jul. 14, 1998

[54] SATELLITE ASSEMBLY HAVING MODULAR COMMON BUS COMPONENTS

[75] Inventors: Sibnath Basuthakur; David R. Laidig. both of Phoenix; David H. Cubbage. Chandler, all of Ariz.

[73] Assignee: Motorola, Inc., Schaumburg, Ill.

[21] Appl. No.: 642,713

[22] Filed: May 3, 1996

[51] Int. Cl.$^6$ ................................................ B64G 1/64
[52] U.S. Cl. .................... 244/161; 244/158 R; 244/172
[58] Field of Search ......................... 244/158 R, 161, 244/164, 172, 173

[56] References Cited

U.S. PATENT DOCUMENTS

| | | | |
|---|---|---|---|
| 4,395,004 | 7/1983 | Ganssle et al. | 244/158 R |
| 4,834,325 | 5/1989 | Faget et al. | 244/158 R X |
| 4,880,187 | 11/1989 | Rourke et al. | 244/158 R X |
| 5,411,226 | 5/1995 | Jones et al. | 244/158 R |

OTHER PUBLICATIONS

Harris, Dr. Dale W., "The Modular Power Subsystem for the Multimission Modular Spacecraft", pp. 9–19.

*Primary Examiner*—William Grant
*Attorney, Agent, or Firm*—Gregory J. Gorrie

[57] ABSTRACT

A satellite assembly (60, 68, 70) is formed from any number of bus modules (22) which have a substantially common shape and interior space volume. Each bus module (22) includes a structural frame (20) which is part of a structural subsystem and at least one and possibly all of a propulsion subsystem (28), a power subsystem (30), a thermal subsystem (32), an attitude, orientation and control subsystem (34), a telemetry, tracking and control subsystem (42) and a payload subsystem (44). Within each bus module (22), the subsystems are substantially non-redundant. Bus modules (22) attach together permanently or temporarily through attachment mechanisms (36). Permanent attachment is used to form large and/or redundancy within the satellites. Temporary attachment is used to increase the structural rigidity of individual bus modules (22) for launch purposes, then the assembly (60) is decomposed into individual satellites.

4 Claims, 9 Drawing Sheets

SATELLITE ASSEMBLY HAVING MODULAR COMMON BUS COMPONENTS

FIELD OF THE INVENTION

The present invention relates generally to the construction and deployment of satellites. Specifically, the present invention relates to satellite assemblies constructed using modular common bus components.

BACKGROUND OF THE INVENTION

Tremendous costs are incurred in the deployment of satellites in orbits around the earth. Two areas of such costs include non-recurring costs for the design of satellites and launch vehicles and recurring costs for equipment, manufacturing and fuel used in each satellite and launch vehicle. In order to minimize non-recurring costs, relatively standardized satellite designs and launch vehicle designs have been adapted for use in a wide range of space applications. This approach allows design costs to be amortized over a larger number of satellite deployments.

Conventional satellite designs are based upon spacecraft buses, also known as platforms, such as the HS601 bus built by Hughes, the A2100 bus built by LockheedMartin and others, which are usable in a geosynchronous earth orbit (GEO). A bus includes all satellite subsystems that support a payload subsystem, but do not include the payload subsystem. Thus, a single bus design can transport and hold diverse payloads to accomplish diverse satellite applications. GEO propulsion system, power system, and other requirements cause the typical GEO-useable bus to be somewhat larger than may be needed for many low earth orbit (LEO) or medium earth orbit (MEO) satellite applications. Since such bus designs are larger than LEO and MEO requirements, they provide workable solutions for LEO and MEO applications in addition to GEO applications. Moreover, their non-recurring design costs can be amortized over a large number of satellite deployments.

However, the relatively large standardized satellite busses that can be adapted for LEO, MEO, or GEO applications are not typically well suited for LEO applications. For example, conventional MEO and GEO satellites tend to be highly redundant. In other words, many of the satellite subsystems are included in duplicate, triplicate, or quadruplicate so that the satellite may continue to function even after one or more of the redundant subsystems fail. The cost of replacing failed satellites is so great that MEO and GEO satellites are designed for long life requiring substantial redundancy. Additionally, significant electronics complexity is required because MEO and GEO satellites endure a relatively large quantity of subatomic particle bombardment which increases the likelihood of subsystem failures.

LEO satellites do not experience the large quantity of sub-atomic particle bombardment that MEO and GEO satellites experience. Furthermore, launch costs to LEO are significantly lower than to GEO and MEO resulting in lower replacement costs for LEO satellites. However, conventional LEO satellites tend to be redundant because the standardized buses are sufficiently large to accommodate the redundancy and replacement costs are still high.

Unfortunately, LEO satellites have radio ranges which cover small portions of the earth's surface compared to GEO satellite coverage areas. Each low capacity satellite can cover its own area of the earth without causing communication interference with other ones of such satellites, and more complete coverage of the earth's surface may be obtained. Consequently, a constellation of LEO communication satellites may be better configured using many distributed low capacity satellites rather than a few centralized high capacity satellites.

BRIEF DESCRIPTION OF THE DRAWINGS

A more complete understanding of the present invention may be derived by referring to the detailed description and claims when considered in connection with the Figures, wherein like reference numbers refer to similar items throughout the figures, and:

DETAILED DESCRIPTION OF THE DRAWINGS

The following describes a satellite assembly having modular common bus components. A modular bus may be used in a variety of LEO, MEO and GEO applications. A single bus module is formed using a structural frame. The single bus module is a substantially non-redundant item of equipment that is capable of carrying its own payload along with other satellite subsystems and of functioning as an independent satellite. However, the bus module is desirably combined with like bus modules to form a satellite assembly. The combined satellite assembly may form a larger and/or more internally redundant satellite. Alternatively, the satellite assembly may be decomposed into individual satellites after being placed in orbit.

Figure 1:
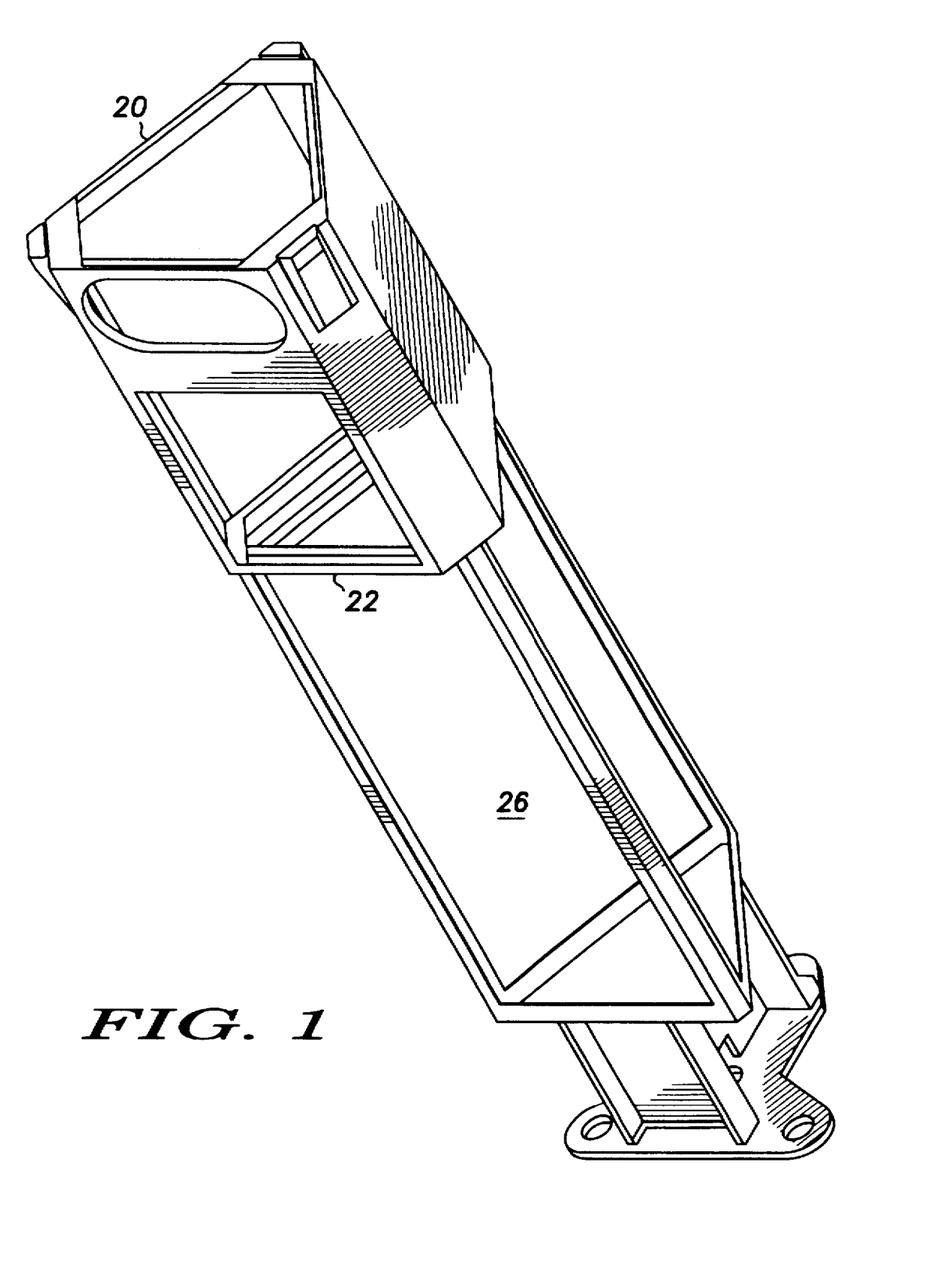
FIG. 1 shows a perspective view of an exemplary structural frame used in a bus module portion of a satellite assembly.
Figure 2:
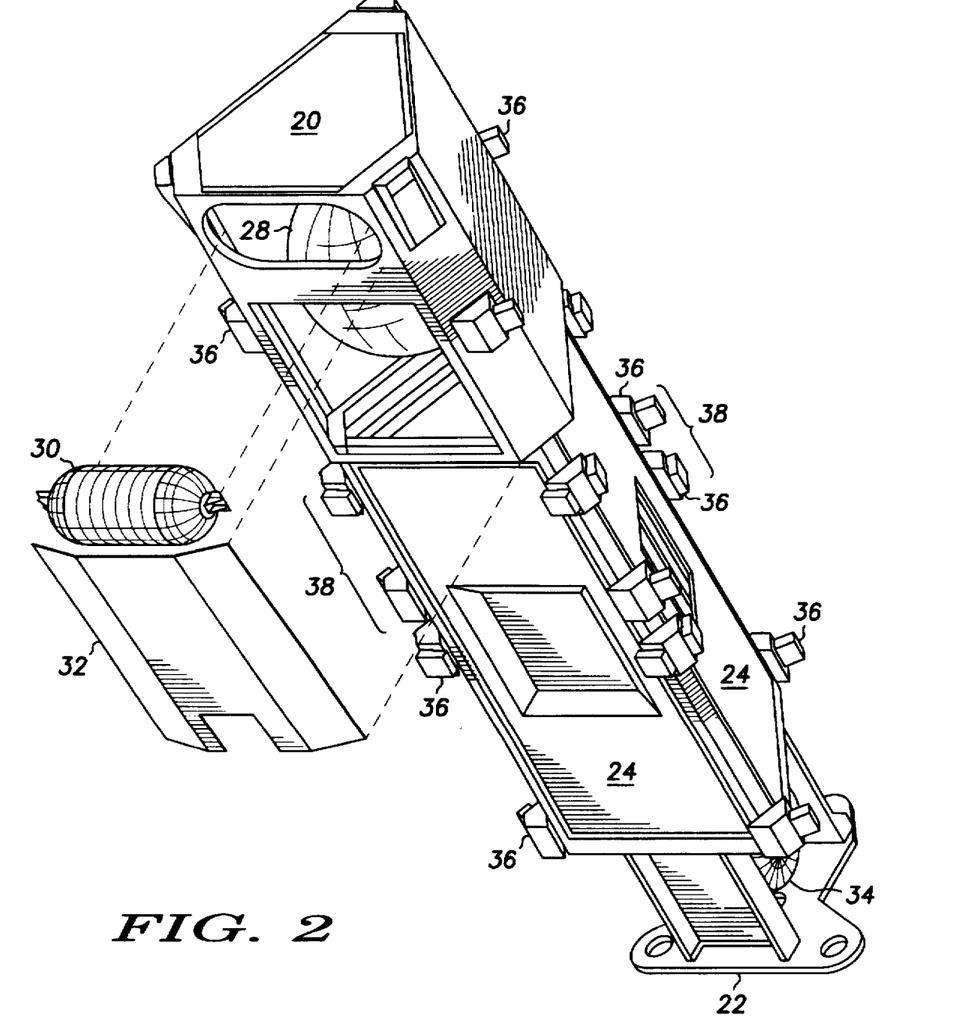
FIG. 2 shows a partially exploded perspective view of portions of a propulsion subsystem, a power subsystem, a thermal subsystem, and an attitude orientation and control subsystem (AOCS) added to the structural frame.

FIG. 1 shows a perspective view of an exemplary structural frame 20 used in a satellite bus module 22. Bus module 22 desirably forms a portion of a satellite assembly which is discussed in more detail below. FIG. 2 shows a partially exploded perspective view of bus module 22. Referring to FIGS. 1 and 2, structural frame 20 represents a portion of the structural subsystem of one of six subsystems which make up a satellite bus. Remaining portions of the structural subsystem include shear panels 24 which attach to structural frame 20 but may be removed to provide access to an interior space 26 of structural frame 20.

FIGS. 1 and 2 illustrate structural frame 20 as having a particular elongated, triangular shape and its interior space 26 as having a particular volume. Except for interior space volume desirably being smaller than interior space volume of conventional satellite buses, a particular shape or interior space volume is unimportant. However, when multiple bus modules 22 are combined together to form satellite assemblies, as discussed below, desirably all bus modules 22 exhibit substantially the same shape and interior space volume. This may be achieved by having all bus modules 22 use structural frames 20 having similar geometrical parameters.

The use of modular common bus components, such as structural frames 20, to form satellite assemblies has many advantages over conventional satellite designs. For example, the common components may be used in a wide variety of efficient LEO, MEO and GEO applications. Thus, non-recurring costs may be amortized over many satellites. Separate modules may be manufactured and tested in parallel using well-known high quality, low cost assembly line techniques. Then the modules may be attached together to form a high quality satellite assembly more quickly and at less cost than can be achieved with conventional satellite designs. Thus, recurring costs are reduced as well.

Moreover, a wider range of flexibility in designing satellites to efficiently meet application needs is achieved by using common modular components, such as structural frame 20. Desirably, redundancies are achieved at the satellite level rather than at the subsystem level. Thus, a single launch may place several small, independent, substantially non-redundant satellites formed from single bus modules 22 in orbit. Such satellites may be efficient and cost effective for many LEO applications. Alternatively, the same launch capability may place a single large and highly redundant satellite assembly formed from two or more bus modules 22 in orbit. Such a satellite may be required for GEO applications. Furthermore, a combination of small and medium satellites may be placed in orbit.

Other than the structural subsystem, the remaining five subsystems of a satellite bus are a propulsion subsystem 28 represented in FIG. 2 by a single propellant tank, a power subsystem 30 represented in FIG. 2 by a single battery, a thermal subsystem represented in FIG. 2 by a single battery radiator panel 32, a telemetry, tracking and control (TT&C) subsystem, (not shown in FIGS. 1 or 2) and an attitude, orientation and control subsystem (AOCS) 34 represented in FIG. 2 by a single momentum wheel. The six subsystems which make up a satellite bus are combined with a payload subsystem (not shown) to form a satellite. Any single bus module 22 included in a satellite assembly may, but need not, include all six subsystems. In order to keep the volume of a bus module 22 reasonably small, only substantially non-redundant subsystems are desirable in any single bus module 22. A single bus module 22 is generally too small to accommodate all subsystems needed to form a satellite if any significant amount of subsystem redundancy is included. However, this small size accommodates the flexibility and other advantages discussed above.

In a first embodiment of the present invention, the structural subsystem components which are constructed around structural frame 20 result in a structural subsystem that has sufficient rigidity to support itself and the remaining subsystems throughout the launch period. Typically, this degree of rigidity far exceeds the structural requirements for an on-orbit satellite.

In a second embodiment of the present invention, the structural subsystem components which are constructed around structural frame 20 result in a structural system that may not exhibit sufficient rigidity to support itself and its associated subsystems during launch. In this second embodiment, a weight savings results over the first embodiment by designing structural frame 20 and remaining structural subsystem components to have less mass using the same materials that may be used in the first embodiment. In this second embodiment, sufficient structural rigidity is achieved by forming a satellite assembly in which two or more bus modules 22 are attached to one another. Each bus module 22 shares structural integrity with the other bus modules 22 included in the satellite assembly.

Bus modules 22 may attach to one another through attachment mechanisms 36. Attachment mechanisms 36 attach at various strategic locations along structural frame 20. The attachment may be permanent or temporary. With permanent attachment, the satellite assembly which includes two or more bus modules 22 operates as a single, individual satellite throughout launch and the on-orbit life of the satellite.

Naturally, the mass and volume of collective subsystems which can be accommodated by the satellite assembly exceeds the mass and volume of subsystems which may be included in a single bus module 22. Thus, a wide range of design flexibility and redundancy management may be accommodated with a permanent attachment. For example, power subsystem 30 may include additional batteries for increased battery capacity and/or redundancy. The propulsion subsystem 28 may include additional propellant tanks to accommodate a bi-propellant propulsion system, redundancies in a mono-propellant propulsion system, or a mono-propellant propulsion system which has a larger mass of on-board propellant.

For temporary attachment, mechanisms 36 collectively operate within a separation system 38. A satellite assembly may be placed in orbit, then decomposed into individual satellites using separation system 38. Separation system 38 may use conventional separation techniques, including pyrotechnic bolts, pin-pulling schemes, and the like. Desirably, attachment mechanisms 36 in separation system 38 include spring-biased mechanisms (not shown) which tend to push bus modules 22 away from one another when separation occurs. Accordingly, for a given satellite launch, several satellites may be launched at once in combinations that closely match the satellite assembly mass and volume with the launch vehicle capacity to achieve a cost savings.

Figure 3:
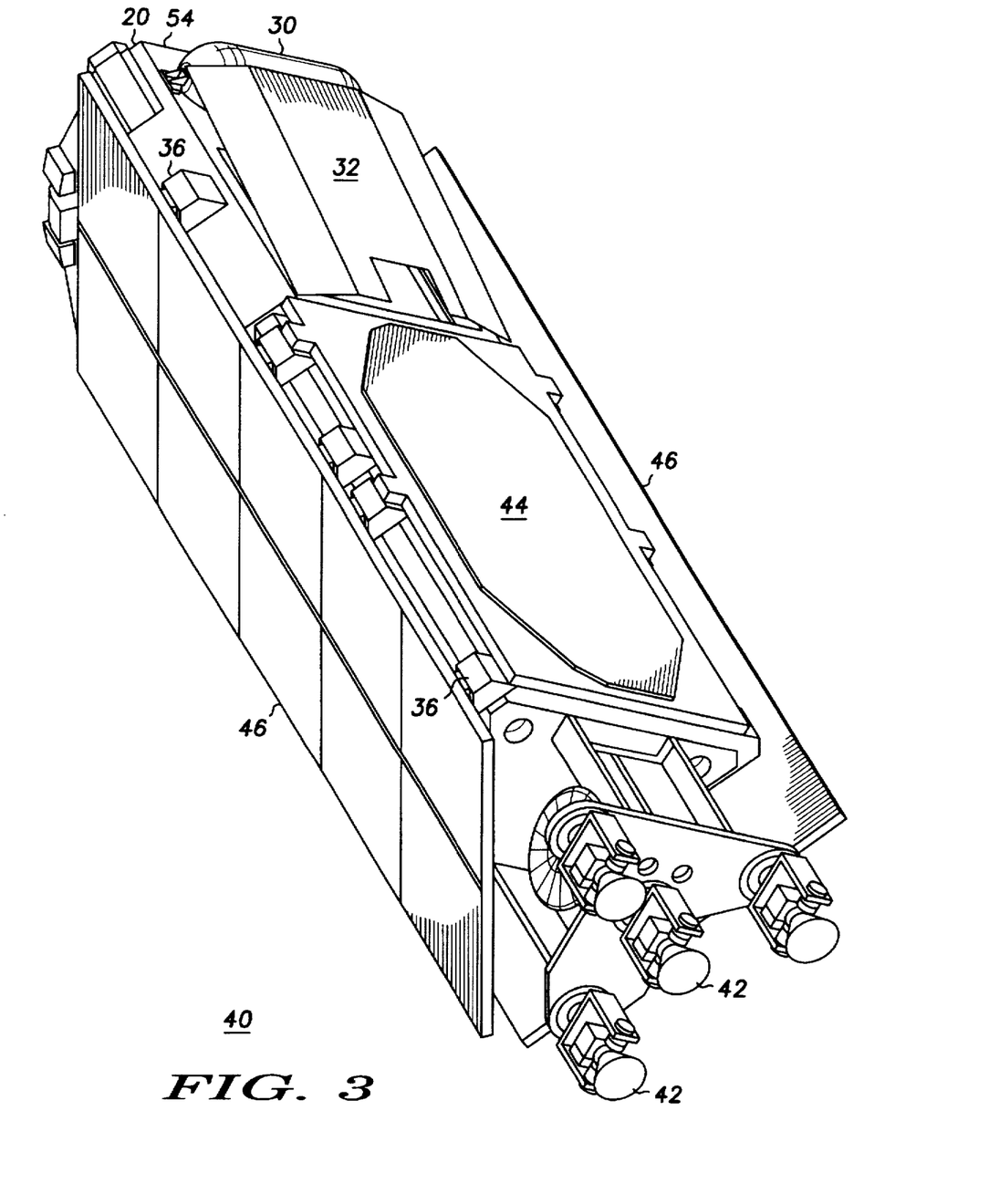
FIG. 3 shows a perspective view of a satellite which has a single bus module, the satellite being illustrated in a launch configuration.

FIG. 3 shows a perspective view of a satellite 40 which is formed from a single bus module 22. Satellite 40 is shown in its launch configuration. In addition to the various subsystems shown in FIGS. 1 and 2, a TT&C subsystem 42 is represented by an antenna through which communications are conducted with ground control stations (not shown) after satellite 40 achieves its orbit. A payload subsystem 44 is represented by various antennas which are particularly desirable in connection with communication satellites. Solar panels 46 are shown articulated against the sides of structural frame 20. For LEO applications, solar panels 46 may articulate with two degrees of freedom, but for GEO applications panels 46 may require only one degree of freedom. Through separation system 38, satellite 40 may temporarily attach to a similar satellite for launch, then be detached on-orbit.

Figure 4:
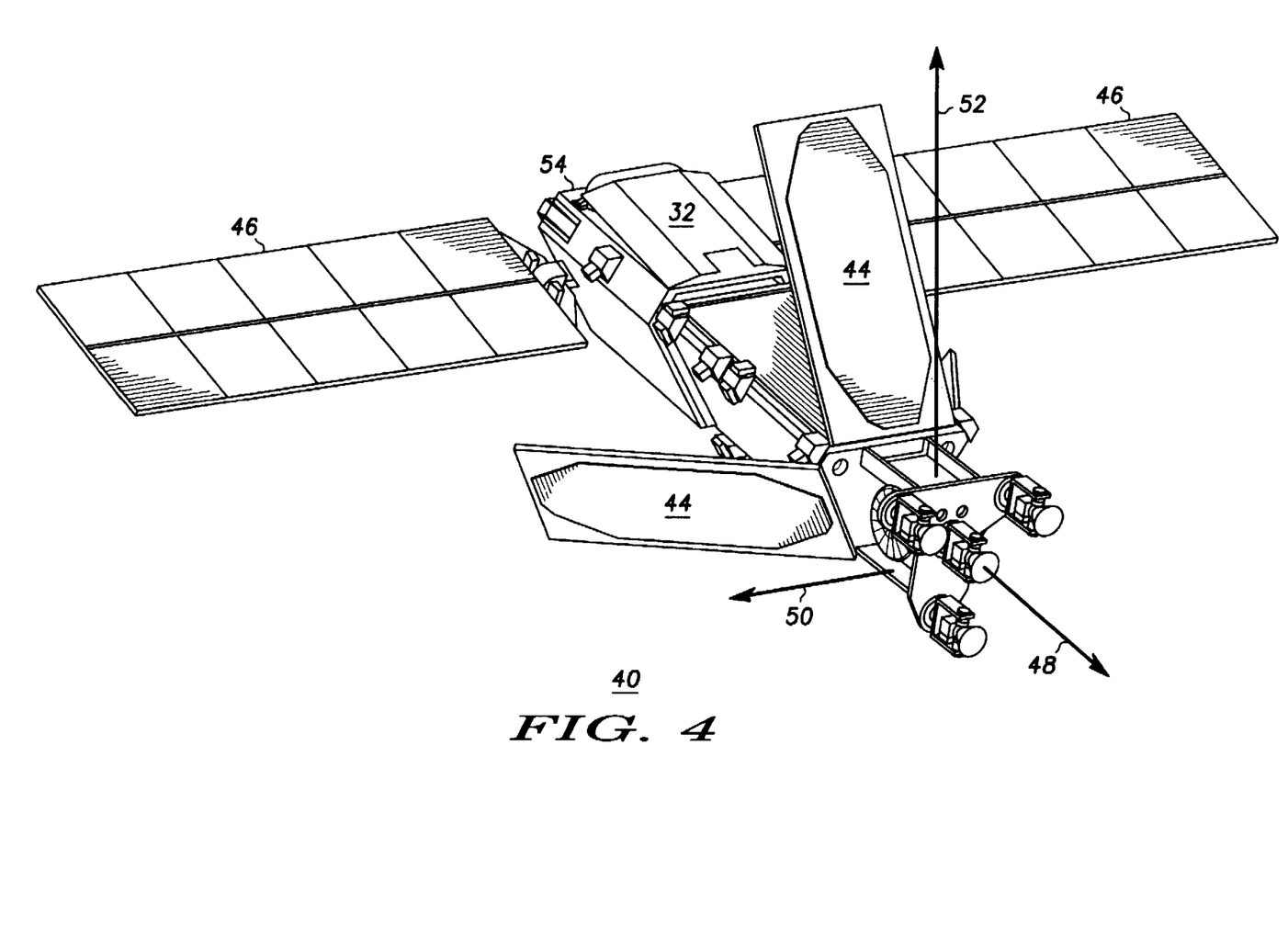
FIG. 4 shows a perspective view of the satellite of FIG. 3 in a deployed configuration for a low earth orbit (LEO)

While a satellite formed using modular bus 22 may be used in diverse applications, its orientation may differ depending on the application. FIG. 4 shows a perspective view of satellite 40 (see FIG. 3) in a deployed configuration for a low earth orbit (LEO). Solar panels 46 and flat antennas used by payload subsystem 44 have been extended. Vectors 48 and 50 illustrate nadir and orbit normal directions, respectively. A vector 52 extends perpendicularly away from a flat surface 54 of modular bus 22 in a velocity direction for satellite 40. This LEO orientation allows radiating surfaces, such as battery radiating panel 32 to minimize direct solar exposure.

Figure 5:
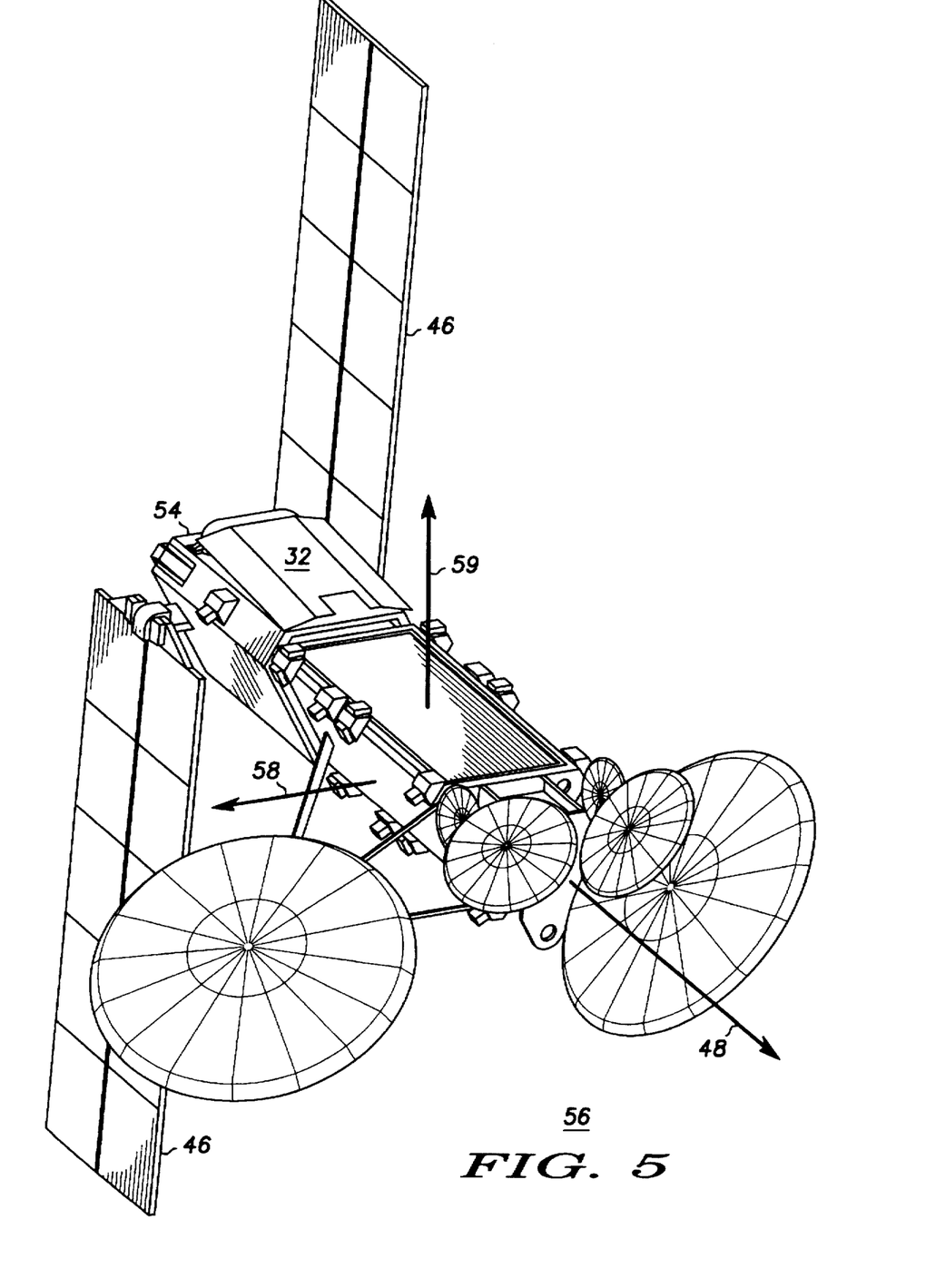
FIG. 5 shows a perspective view of a satellite which has a single bus module, the satellite being illustrated in a deployed configuration for a geosynchronous earth orbit (GEO)

In contrast to the LEO orientation of FIG. 4, FIG. 5 shows a perspective view of a satellite 56 which has a single bus module 22 and is deployed in a geosynchronous earth orbit (GEO). For the GEO orientation, nadir vector 48 points in substantially the same direction as for the LEO orientation. However, a velocity vector 58 extends outwardly parallel to flat radiating surface 54, and flat radiating surface 54 desirably faces either north or south, as indicated by vector 59. Accordingly, a single bus module 22 may be adapted to diverse applications by proper on-orbit orientation.

Figures 6, 7, 8, 9, 10:
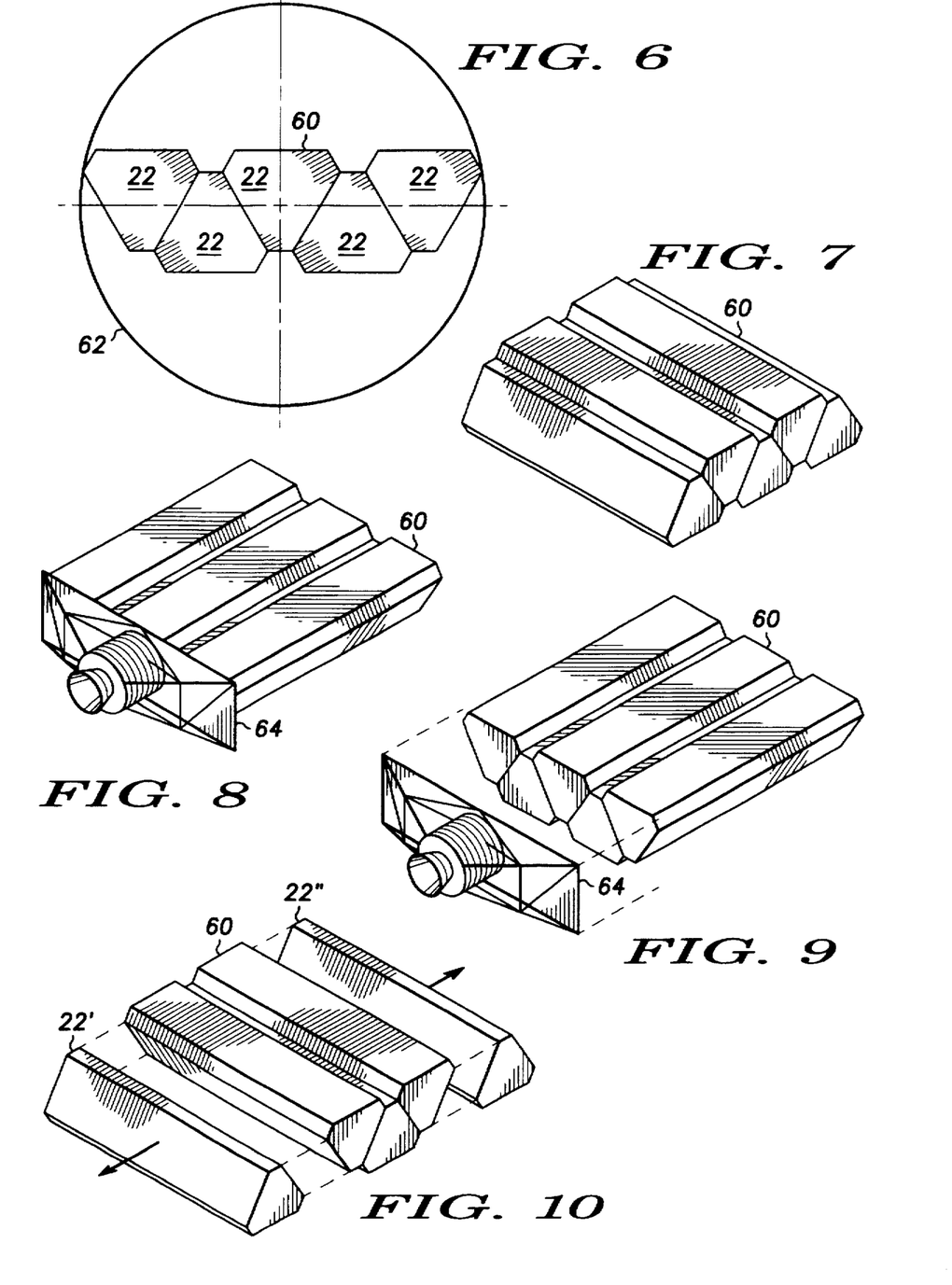
FIG. 6 shows a cross-sectional view of an exemplary satellite assembly having five bus modules, the satellite assembly being stowed within a launch fairing.
FIG. 7 shows a perspective schematic view of a satellite assembly having five bus modules.
FIG. 8 shows a perspective schematic view of the satellite assembly of FIG. 7 relative to an integral apogee booster (IAB) or other launch platform.
FIG. 9 shows a perspective schematic view of the satellite assembly of FIG. 8 after separation from the IAB.
FIG. 10 shows a perspective schematic view of the satellite assembly of FIG. 9 after decomposition into three separate satellites of varying size.

FIGS. 6–13 show how bus modules 22 may operate together as satellite assemblies in various exemplary situations. FIG. 6 shows a cross-sectional view of an exemplary satellite assembly 60 having five bus modules 22. Each bus module 22 in assembly 60 has a substantially similar shape and interior space volume to the other bus modules 22. While the triangular cross-sectional shape illustrated in FIG. 6 is not a requirement of the present invention, this geometric shape allows a relatively large number of bus modules 22 to be attached together through attachment mechanisms 36 (see FIG. 2) to form an assembly 60 which may fit within a conventional launch fairing 62. Those skilled in the art will appreciate that assembly 60 need not include five bus modules 22 but may include any number of bus modules 22. As discussed above, individual ones of bus modules 22 need not have sufficient structural rigidity to withstand the vibration and forces experienced during launch on its own. However, the shared structural integrity achieved by forming assembly 60 provides such structural rigidity.

FIGS. 7–10 illustrate an exemplary process of launching satellite assembly 60 and decomposing the assembly into individual satellites. FIG. 7 shows a perspective schematic view of satellite assembly 60, with bus modules 22 attached together during launch. Next, FIG. 8 shows a perspective schematic view of satellite assembly 60 from FIG. 7 relative to an integral apogee booster (IAB) 64 or other launch platform which may take satellite assembly 60 to its final orbit. The use of an IAB, as depicted is no requirement of the present invention. After ascent to orbit, the launch platform may detach from satellite assembly 60, as shown in FIG. 9. Next, satellite assembly 60 is decomposed into individual satellites, as shown in FIG. 10. As illustrated in FIG. 10, bus modules 22' and 22" may detach from a satellite assembly 60' which includes three other bus modules 22. Detachment may occur through the operation of separation system 38 (see FIG. 2). After detachment, the individual satellites which are formed from bus module 221, satellite assembly 60', and bus module 22" are independently moved away from one another to their final positions on orbit. The bus modules 22 which form satellite assembly 60' may remain permanently attached to one other or may be subsequently detached from one another to form still other smaller individual satellites.

Figure 11:
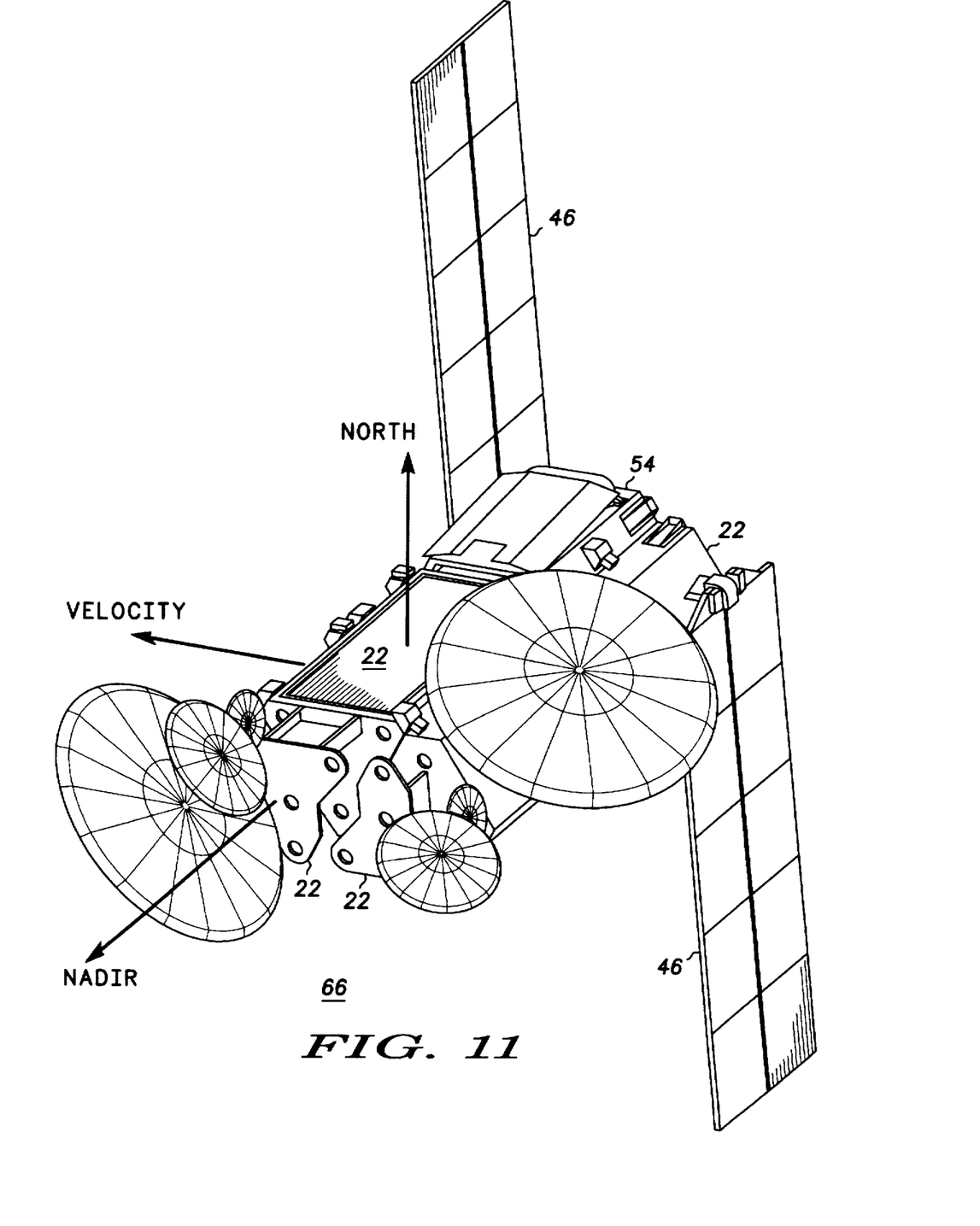
FIG. 11 shows a perspective view of a satellite assembly which has two bus modules, the satellite assembly being illustrated in a deployed configuration.

FIG. 11 shows a perspective view of a satellite assembly 66 which has two bus modules 22. FIG. 11 illustrates satellite assembly 66 in a deployed configuration. Assembly 66 is formed from two permanently attached bus modules 22. Flat radiating surfaces 54 from bus modules 22 face north and south as required for GEO applications. Only one solar panel 46 attaches to each bus module 22, and each solar panel 46 may be formed from two modular sections. Accordingly, the solar panel area may increase in proportion to increased power requirements imposed by increased subsystem capacity.

Figure 12:
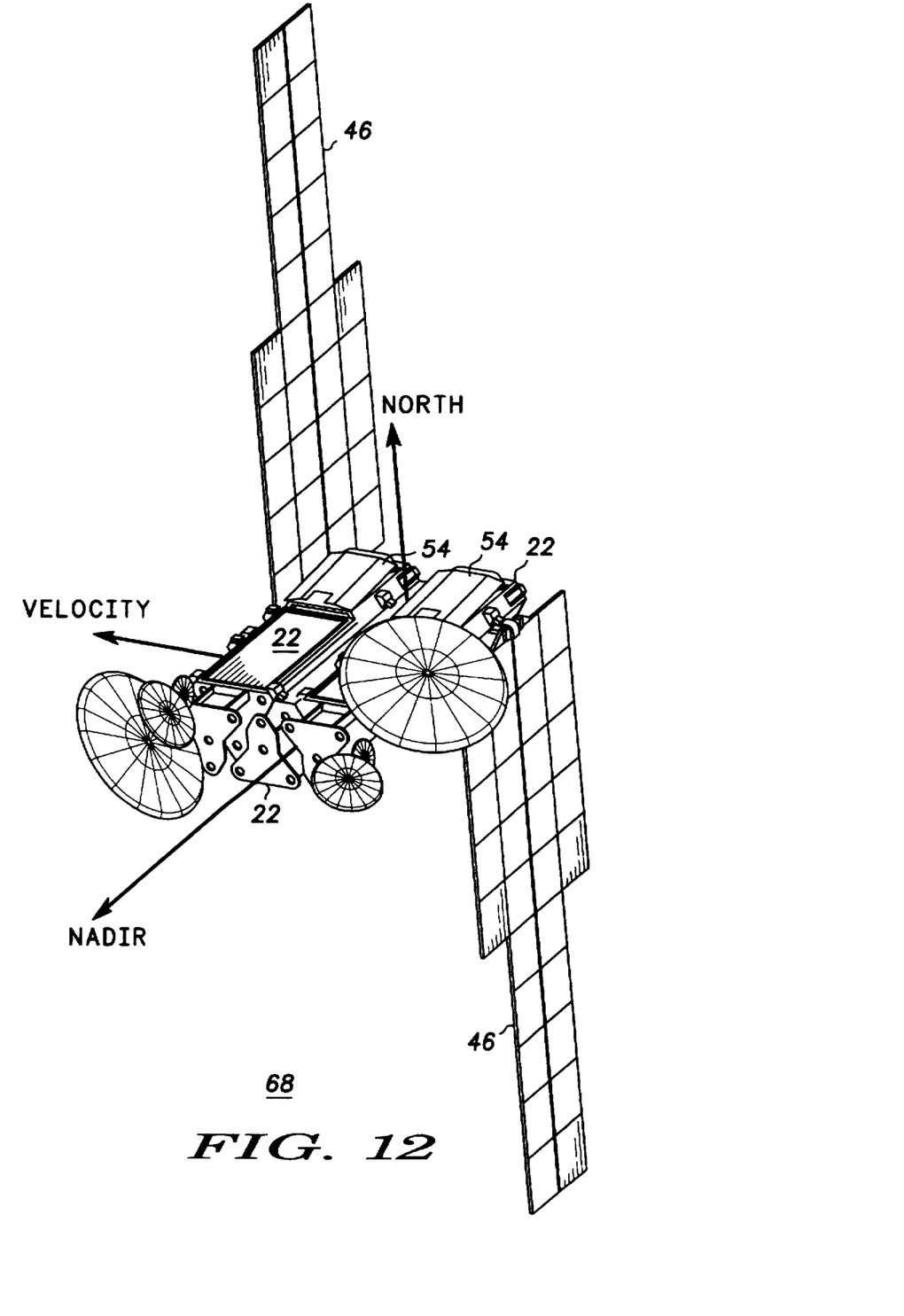
FIG. 12 shows a perspective view of a satellite assembly which has three bus modules, the satellite assembly being illustrated in a deployed configuration.
Figure 13:
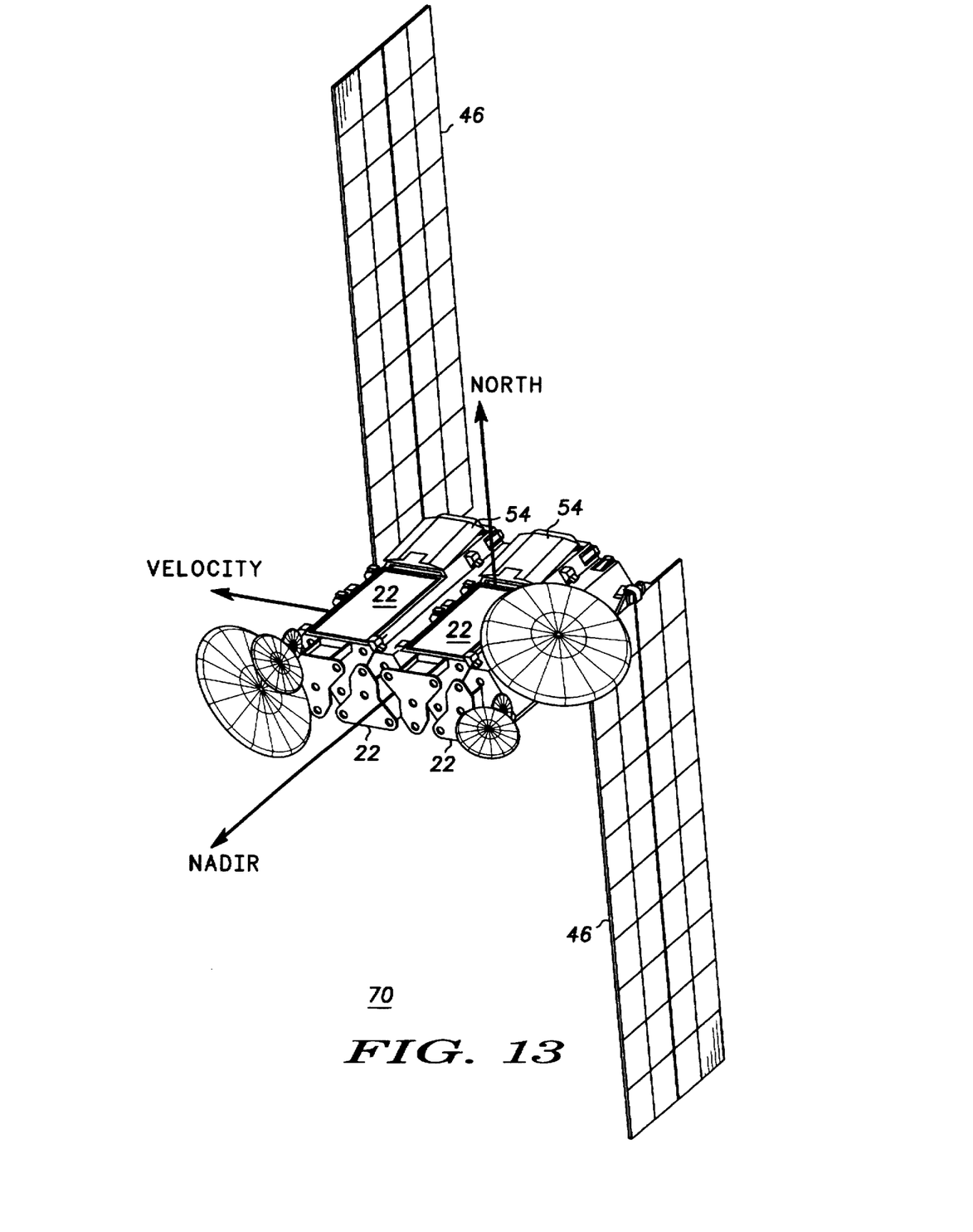
FIG. 13 shows a perspective view of a satellite assembly which has four bus modules, the satellite assembly being illustrated in a deployed configuration.

FIG. 12 shows a perspective view of a satellite assembly 68 which has three permanently attached bus modules, and FIG. 13 shows a perspective view of a satellite assembly 70 which has four permanently attached bus modules. FIGS. 12 and 13 illustrate satellite assemblies 68 and 70, respectively, in their deployed configurations. For each satellite assembly 68 and 70, flat radiating surfaces 54 of modules 22 face north and south. Solar panels 46 attach only to the outer bus modules 22 of assemblies 68 and 70. Moreover, the surface area of solar panels 46 may increase in proportion to the number of bus modules 22 included in satellite assemblies 68 and 70. For example, the surface area of solar panels 46 may increase in proportion to increased power requirements imposed by increased system capacity.

In summary, the present invention provides a satellite assembly having modular common bus components. These components may be used in a variety of LEO, MEO and GEO applications. A single bus module uses a common structural frame and is desirably a substantially nonredundant item of equipment that is capable of carrying its own payload along with other satellite subsystems and of functioning as an independent satellite. The bus module may be permanently or temporarily attached to like bus modules to form a satellite assembly. The satellite assembly may form a larger and/or more internally redundant satellite than can be formed from a single bus module. Alternatively, the satellite assembly may be decomposed into individual satellites after being placed in orbit.

The present invention has been described above with reference to preferred embodiments. However, those skilled in the art will recognize that changes and modifications may be made in these preferred embodiments without departing from the scope of the present invention. For example, the particular bus module shapes and deployment configurations described herein may be modified from application to application. These and other changes and modifications which are obvious to those skilled in the art are intended to be included within the scope of the present invention.

What is claimed is:

1. A satellite assembly with modular bus components for delivery to and placement in an orbit, said satellite assembly comprising:

a plurality of bus modules, each bus module comprised of a structural frame having substantially identical shape and defining interior spaces having approximately equal volumes, each bus module having substantially identical bus subsystems, said substantially identical bus subsystems comprising a thermal subsystem, a telemetry, tracking and control subsystem, a power subsystem, an attitude, orientation and control subsystem, and a propulsion subsystem;

a single apogee booster coupled to said plurality of bus modules for taking the satellite assembly to a final orbit, said apogee booster configured to detach from said plurality of bus modules after ascent of said satellite assembly to said final orbit;

a separation system for separating the plurality of bus modules into individual satellite subassemblies after detachment of the apogee booster from said plurality of bus modules, each individual satellite subassembly being a separate satellite and comprised of one or more of said bus modules, and wherein at least one individual satellite assembly is comprised of at least two of said bus modules.

2. A satellite assembly with modular bus components for delivery to and placement in an orbit, said satellite assembly comprising:

a plurality of bus modules, each bus module comprised of a structural frame defining interior spaces having approximately equal volumes, each bus module having at least one of a plurality of bus subsystems;

a single apogee booster coupled to said plurality of bus modules for taking the satellite assembly to a final orbit, said apogee booster configured to detach from said plurality of bus modules after ascent of said satellite assembly to said final orbit;

a separation system for separating the plurality of bus modules into individual satellite subassemblies after detachment of the apogee booster from said plurality of bus modules, each individual satellite subassembly being a separate satellite and comprised of one or more of said bus modules, and wherein at least one individual satellite subassembly is comprised of at least two of said bus modules, and each individual satellite assembly having at least one of each bus subsystem of said plurality, each bus module being a substantially non-redundant item.

3. A satellite assembly as claimed in 2 wherein:

said bus subsystems comprise a telemetry, tracking and control subsystem, a power subsystem, an attitude, orientation and control subsystem, and a propulsion subsystem.

4. A method for placing payloads in orbit around the earth using modular bus components, said method comprising the steps of:

launching a satellite assembly comprised of a plurality of bus modules and a single apogee booster, each bus module comprised of a structural frame having substantially identical shape and defining interior spaces having approximately equal volumes, each bus module having at least one of a plurality of bus subsystems, said plurality of bus subsystems comprising a thermal subsystem, a telemetry, tracking and control subsystem, a power subsystem, an attitude, orientation and control subsystem, and a propulsion subsystem;

boosting said satellite assembly into a final orbit with the single apogee booster coupled to said plurality of bus modules;

detaching said apogee booster from said plurality of bus modules after ascent of said satellite assembly to said final orbit;

separating the plurality of bus modules into individual satellite subassemblies after detachment of the apogee booster from said plurality of bus modules, each individual satellite subassembly being a separate satellite and comprised of one or more of said bus modules, and wherein at least one individual satellite assembly is comprised of at least two of said bus modules, and wherein each individual satellite subassembly has at least one of each bus subsystem of said plurality, each bus module being a substantially non-redundant item.

* * * * *

UNITED STATES PATENT AND TRADEMARK OFFICE
CERTIFICATE OF CORRECTION

PATENT NO. : 5,779,195
DATED : July 14, 1998
INVENTOR(S) : Sibnath Basuthakur; David R. Laidig; David H. Cubbage It is certified that error appears in the above-identified patent and that said Letters Patent is hereby corrected as shown below:

Column 7, claim 2, line 33; delete "assembly" and insert --subassembly--.

Column 7, claim 3, line 36; after "as claimed in" add the word "claim".

Column 8, claim 3, line 1; after the word "comprise" add ":".

Signed and Sealed this

Twentieth Day of October, 1998

Attest:

BRUCE LEHMAN

Attesting Officer

Commissioner of Patents and Trademarks